(12) United States Patent
Liao

(10) Patent No.: US 6,745,480 B1
(45) Date of Patent: Jun. 8, 2004

(54) SAW HAVING AN ANGLE ADJUSTABLE BLADE

(76) Inventor: Yung-chyuan Liao, P.O. Box 65-45, Taichuang (TW), 403

(*) Notice: Subject to any disclaimer, the term of this patent is extended or adjusted under 35 U.S.C. 154(b) by 19 days.

(21) Appl. No.: 10/298,432

(22) Filed: Nov. 15, 2002

(51) Int. Cl.[7] .............................................. B27B 21/00
(52) U.S. Cl. ............................ 30/519; 81/62; 81/177.9
(58) Field of Search ......................... 30/519, 339, 527, 30/517; 16/110.1; 81/61–63.2, 177.7, 177.9; 192/43.1

(56) References Cited

U.S. PATENT DOCUMENTS

| | | | | |
|---|---|---|---|---|
| 168,590 A | * | 10/1875 | Tanner .......................... | 30/519 |
| 170,970 A | * | 12/1875 | Tanner .......................... | 30/519 |
| 2,407,558 A | * | 9/1946 | Kress .......................... | 192/43.1 |
| 2,741,248 A | * | 4/1956 | Woodhall ..................... | 606/176 |
| 3,114,402 A | * | 12/1963 | Jacoff ............................ | 30/519 |
| 3,338,278 A | * | 8/1967 | Reuterfors ................... | 30/166.3 |
| 5,070,614 A | * | 12/1991 | Hardin et al. .................. | 30/527 |
| 5,787,594 A | * | 8/1998 | Estrada .......................... | 30/531 |
| 6,047,802 A | * | 4/2000 | Huang ........................ | 192/43.2 |
| 6,349,619 B1 | * | 2/2002 | Liao .............................. | 81/62 |

* cited by examiner

Primary Examiner—Douglas D. Watts

(57) ABSTRACT

A saw having an angle adjustable blade includes a handle and a blade. The handle includes a body and a ratchet structure. The ratchet structure includes a positioning member and a ratchet rod. Thus, the angle of the blade relative to the handle may be adjusted arbitrarily by rotating the blade relative to the handle, without having to change and adjust the angle of the handle, thereby facilitating the user operating the handle, and thereby preventing the user's wrist from being hurt.

15 Claims, 6 Drawing Sheets

SAW HAVING AN ANGLE ADJUSTABLE BLADE

BACKGROUND OF THE INVENTION

1. Field of the Invention

The present invention relates to a saw having an angle adjustable blade, and more particularly to a saw having an angle adjustable blade, wherein the angle of the blade relative to the handle may be adjusted arbitrarily by rotating the blade relative to the handle, without having to change and adjust the angle of the handle, thereby facilitating the user operating the handle, and thereby preventing the user's wrist from being hurt.

2. Description of the Related Art

A conventional saw comprises a handle and a blade. However, in the conventional saw, the blade is fixed on the handle, so that the angle of the blade cannot be adjusted so as to fit the orientation of the workpiece that is to be sawed, thereby causing inconvenience to the user, and thereby decreasing the versatility of the conventional saw.

The closest prior art of which the applicant is aware is disclosed in his U.S. Pat. No. 6,349,619-B1 and his U.S. patent application Ser. No. 09/909,019.

SUMMARY OF THE INVENTION

The present invention has arisen to mitigate and/or obviate the disadvantage of the conventional saw.

The primary objective of the present invention is to provide a saw having an angle adjustable blade, wherein the angle of the blade relative to the handle may be adjusted arbitrarily by rotating the blade relative to the handle, without having to change and adjust the angle of the handle, thereby facilitating the user operating the handle, and thereby preventing the user's wrist from being hurt.

Another objective of the present invention is to provide a saw having an angle adjustable blade, wherein the angle of the blade relative to the handle may be adjusted arbitrarily so as to match the direction of the workpiece, so that the blade is used to saw the workpiece in the right direction, thereby preventing the blade from being broken, and thereby increasing the lifetime of the blade.

In accordance with the present invention, there is provided a saw having an angle adjustable blade, comprising a handle and a blade, the handle including a body and a ratchet structure, the ratchet structure including a positioning member and a ratchet rod, wherein:

the positioning member is mounted on the body and has a periphery formed with two adjacent notches for receiving two toothed ratchet blocks and a through hole located between the two notches for receiving an elastic member which is urged between the two ratchet blocks, a rotation ring is mounted on the positioning member to encompass the two ratchet blocks, the rotation ring has an inner wall formed with three positioning recesses, a restoring spring is mounted in the periphery of the positioning member, for pressing a positioning ball which is locked in one of the three positioning recesses of the rotation ring; and the ratchet rod is mounted between the positioning member and the rotation ring, and has a rear side having an inner wall formed with a plurality of ratchet teeth meshing with the two ratchet blocks, and a front side for mounting the blade.

Further benefits and advantages of the present invention will become apparent after a careful reading of the detailed description with appropriate reference to the accompanying drawings.

DETAILED DESCRIPTION OF THE INVENTION

Figure 1:
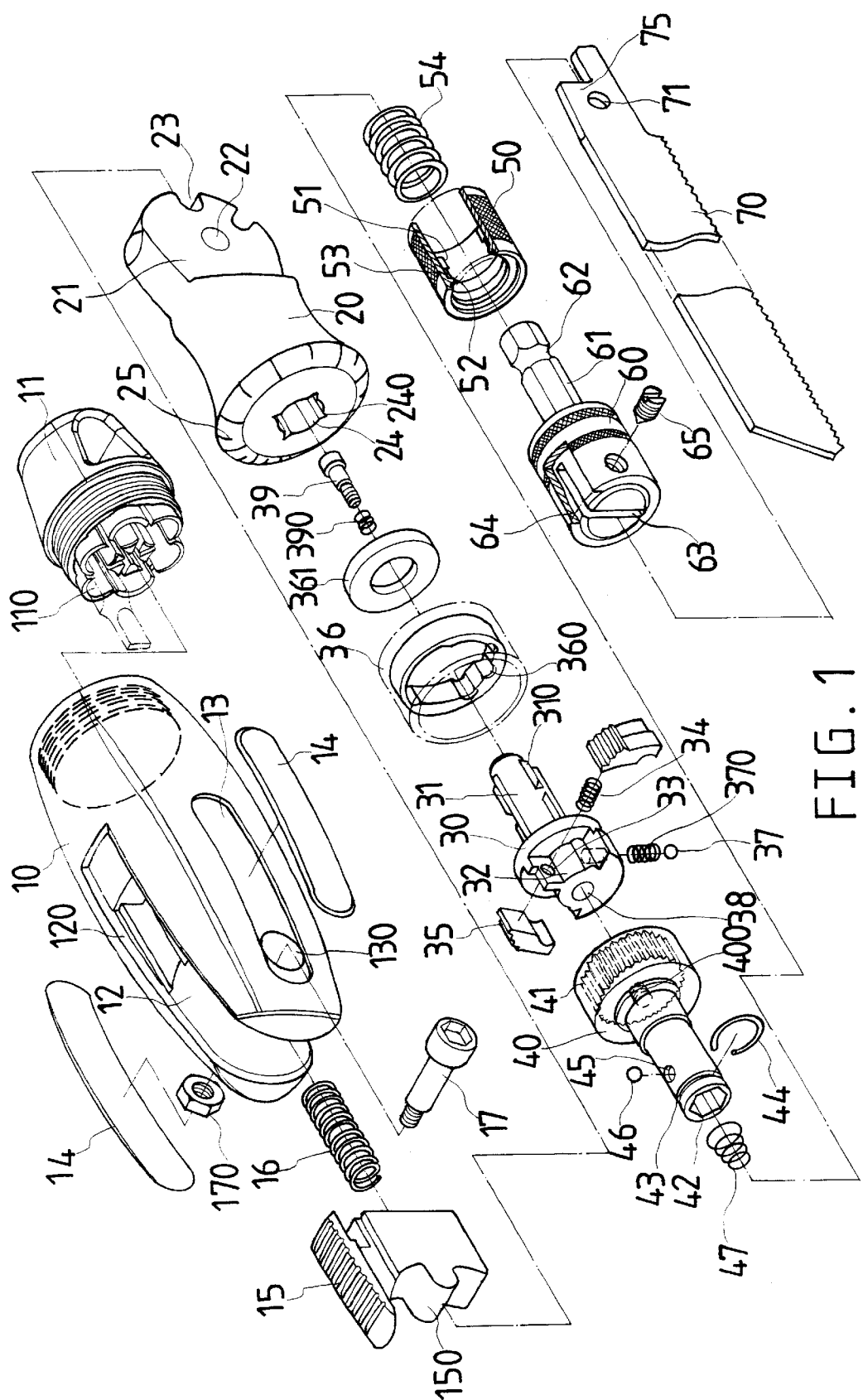
FIG. 1 is an exploded perspective view of a saw having an angle adjustable blade in accordance with a preferred embodiment of the present invention.
Figure 2:
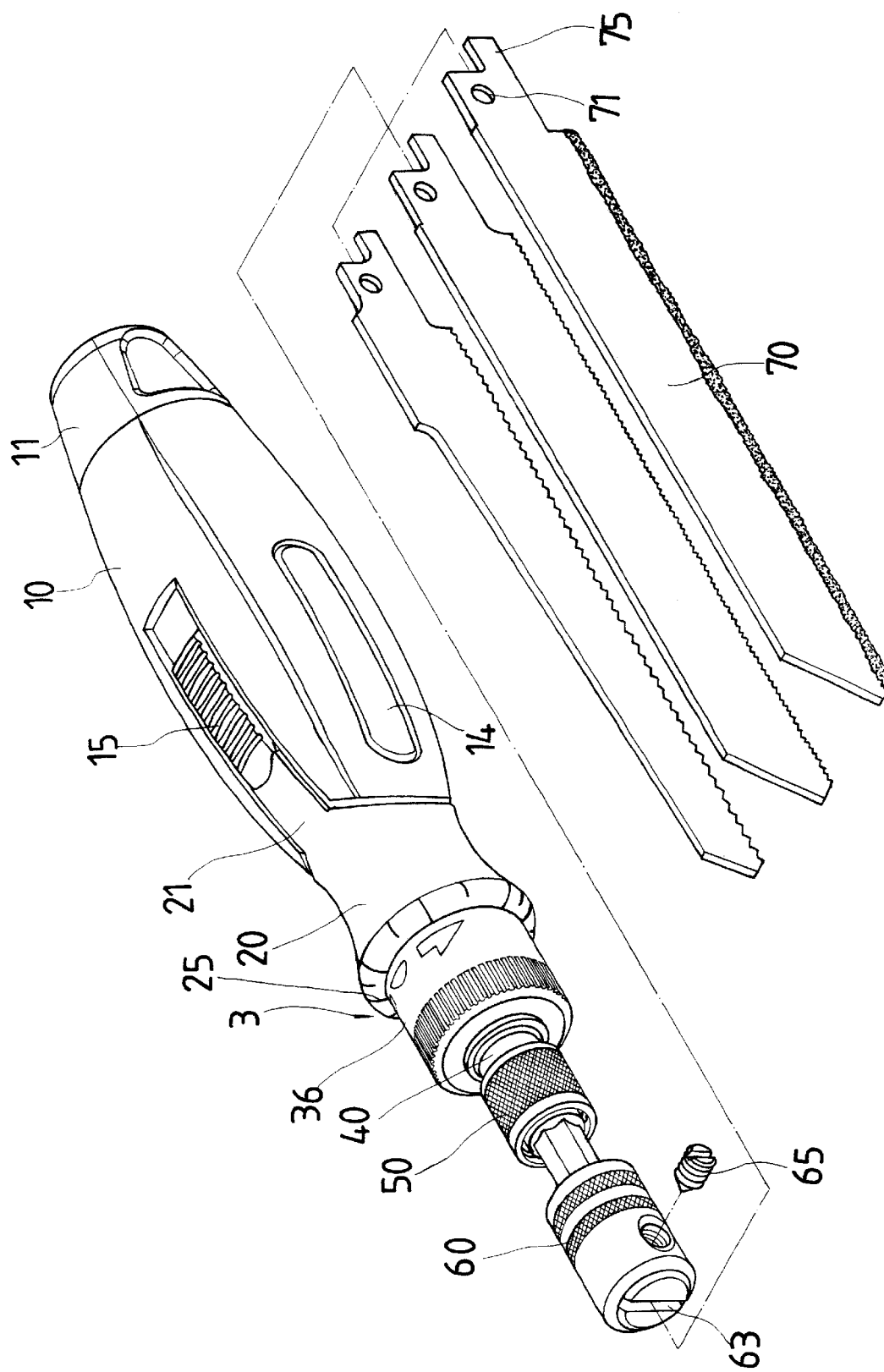
FIG. 2 is a perspective assembly view of the saw having an angle adjustable blade as shown in FIG. 1.
Figure 3:
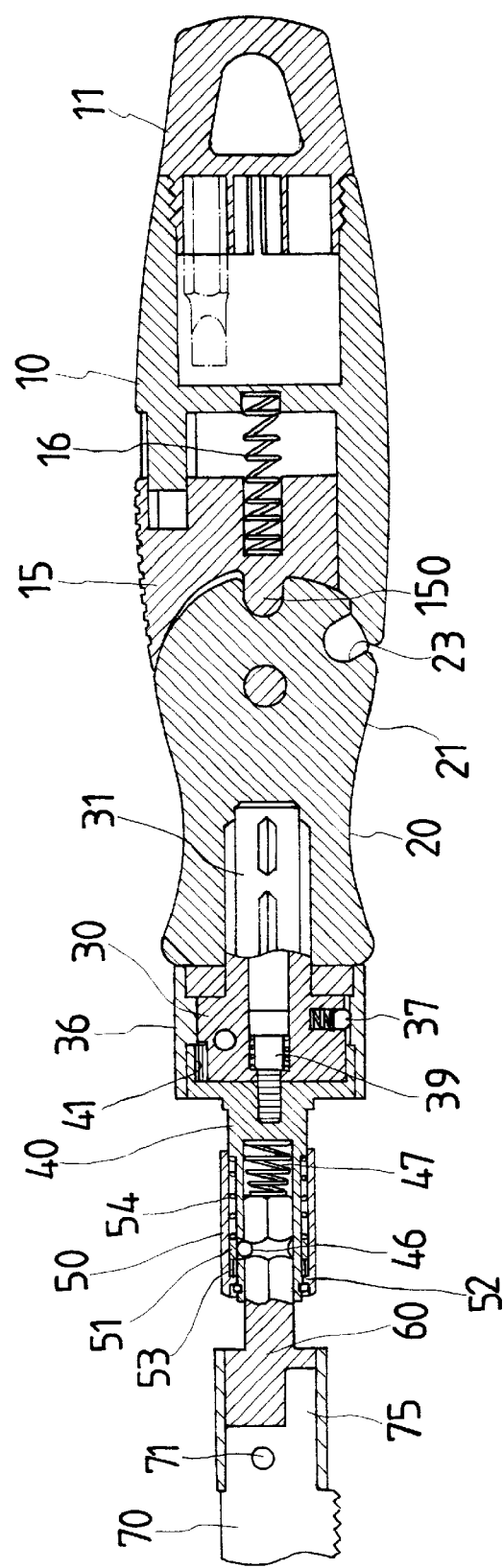
FIG. 3 is a partially cut-away side plan cross-sectional assembly view of the saw having an angle adjustable blade as shown in FIG. 1.

Referring to the drawings and initially to FIGS. 1–3, a saw having an angle adjustable blade in accordance with a preferred embodiment of the present invention comprises a handle and a blade 70.

The handle includes a body 10, a pivot seat 20, and a ratchet structure 3.

The body 10 has a rear end formed with an opening for screwing an end cap 11 which is formed with a plurality of chambers 110 for receiving screwdrivers. The body 10 has a front end formed with a receiving recess 12 and a slide slot 120 communicating with the receiving recess 12. The body 10 has two sides each formed with an insertion recess 13 for insertion of a protective pad 14. The insertion recess 13 of the body 10 has a wall formed with a sink hole 130 communicating with the receiving recess 12.

A push block 15 is slidably mounted in the receiving recess 12 of the body 10, and has a top edge slidably mounted in the slide slot 120 of the body 10. The push block 15 has a front side formed with a protruding locking portion 150. A restoring spring 16 is mounted in the receiving recess 12 of the body 10, and is urged between the rear side of the push block 15 and the body 10.

The pivot seat 20 has a rear end formed with an arcuate pivot block 21 pivotally mounted in the receiving recess 12 of the body 10. The pivot block 21 of the pivot seat 20 has a center formed with a pivot hole 22. A pivot pin 17 is extended through the pivot hole 22 of the pivot block 21 of the pivot seat 20 and the sink hole 130 of the body 10, and is screwed with a nut 170, so that the pivot block 21 of the pivot seat 20 is pivotally mounted on the body 10. The pivot block 21 of the pivot seat 20 has a periphery formed with a plurality of locking recesses 23, so that the locking portion 150 of the push block 15 is locked in one of the locking recesses 23. The pivot seat 20 has a front end formed with an insertion hole 24 which has a periphery formed with a plurality of retaining slits 240. The front end of the pivot seat 20 has a periphery formed with a plurality of angle scales 25.

The ratchet structure 3 includes a positioning member 30 and a ratchet rod 40.

The positioning member 30 is provided with an insertion rod 31 inserted into the insertion hole 24 of the pivot seat 20.

The insertion rod 31 of the positioning member 30 has a periphery formed with a plurality of retaining plates 310 locked in the retaining slits 240 of the insertion hole 24 of the pivot seat 20, to prevent the positioning member 30 from being rotated freely.

Referring to FIGS. 1–4, the positioning member 30 has a periphery formed with two adjacent notches 32 for receiving two toothed ratchet blocks 35 and a through hole 33 located between the two notches 32 for receiving an elastic member 34 which is urged between the two ratchet blocks 35. A rotation ring 36 is mounted on the positioning member 30 to encompass the two ratchet blocks 35. The rotation ring 36 has an inner wall formed with three positioning recesses 360. A washer 361 is mounted between the rotation ring 36, the positioning member 30 and the pivot seat 20. A restoring spring 370 is mounted in the periphery of the positioning member 30, for pressing a positioning ball 37 which is locked in one of the three positioning recesses 360 of the rotation ring 36. The positioning member 30 has a center formed with a stepped pivot hole 38.

The ratchet rod 40 is mounted between the positioning member 30 and the rotation ring 36, and has a rear side having a center formed with a screw bore 400. A threaded pivot post 39 is extended through an elastic member 390, the pivot hole 38 of the positioning member 30, and is screwed into the screw bore 400 of the ratchet rod 40. The rear side of the ratchet rod 40 has an inner wall formed with a plurality of ratchet teeth 41 meshing with the two ratchet blocks 35. The ratchet rod 40 has a front side having an inner wall formed with a polygonal hole 42 for receiving a push spring 47 and an outer wall formed with an annular snap groove 43 for snapping a C-shaped snap 44. The front side of the ratchet rod 40 has a periphery formed with a through hole 45 for receiving a retaining ball 46.

A quick release structure is mounted on the ratchet rod 40 and includes a push ring 50 slidably mounted on the ratchet rod 40 by using the C-shaped snap 44. The push ring 50 has an inner wall formed with a press flange 51 for pressing the retaining ball 46 of the ratchet rod 40, a retaining flange 52 rested on the C-shaped snap 44, and an annular groove 53 located between the press flange 51 and the retaining flange 52 for receiving the retaining ball 46 of the ratchet rod 40. A restoring spring 54 is mounted between the press flange 51 of the push ring 50 and the ratchet rod 40.

A fixing rod 60 has a rear end formed with a polygonal post 61 which is inserted into the polygonal hole 42 of the ratchet rod 40 and is formed with an annular retaining groove 62 for retaining the retaining ball 46 of the ratchet rod 40. The fixing rod 60 has a front end formed with a stepped clamping slit 63 and having a periphery formed with an annular sleeve 64.

The blade 70 has one end formed with a stepped clamping plate 75 inserted into the stepped clamping slit 63 of the fixing rod 60 and formed with a through hole 71. An urging screw 65 is screwed into the annular sleeve 64 and the fixing rod 60, and is extended through the through hole 71 of the stepped clamping plate 75 of the blade 70, so as to lock the annular sleeve 64, the fixing rod 60 and blade 70 by the urging screw 65.

Figure 4:
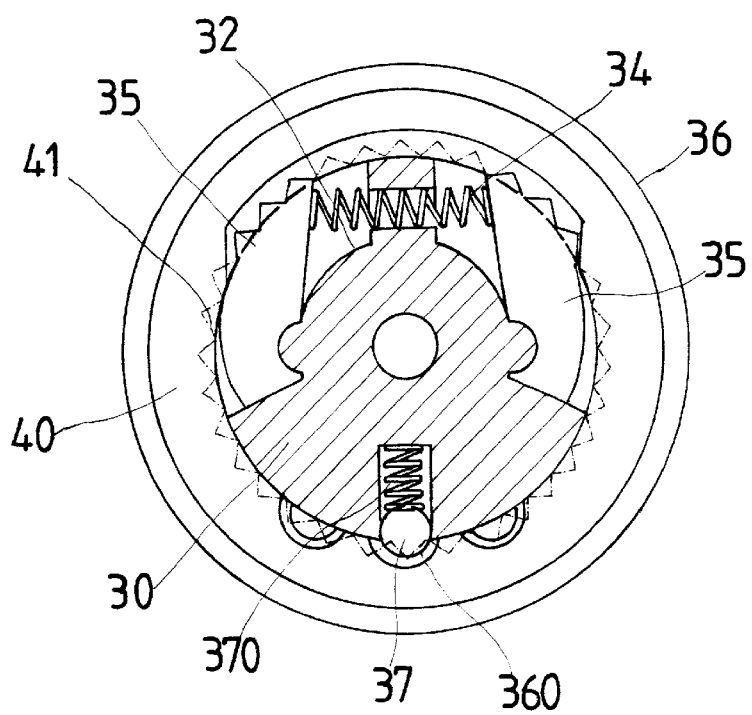
FIG. 4 is a partially front plan cross-sectional assembly view of the saw having an angle adjustable blade as shown in FIG. 1.
Figure 5:
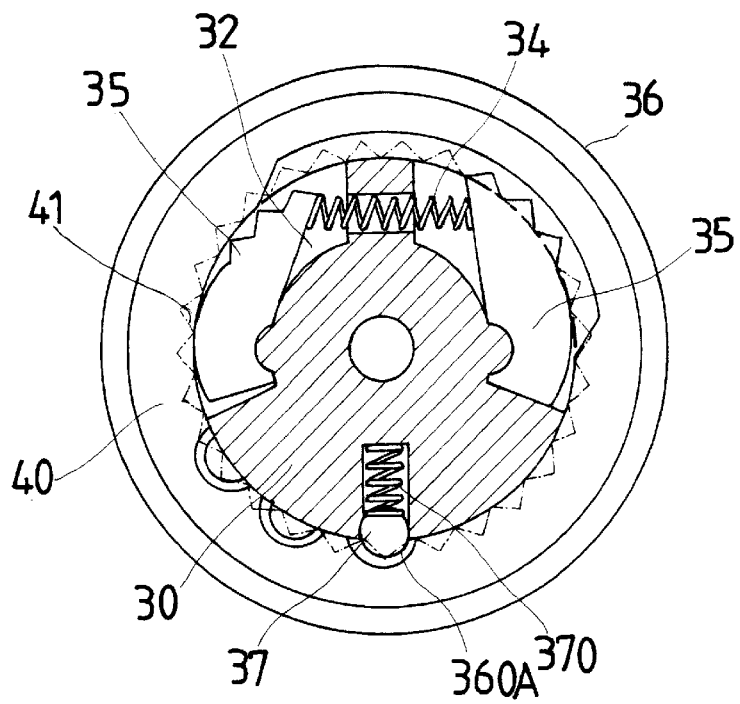
FIG. 5 is a schematic operational view of the saw having an angle adjustable blade as shown in FIG. 4 in use.
Figure 6:
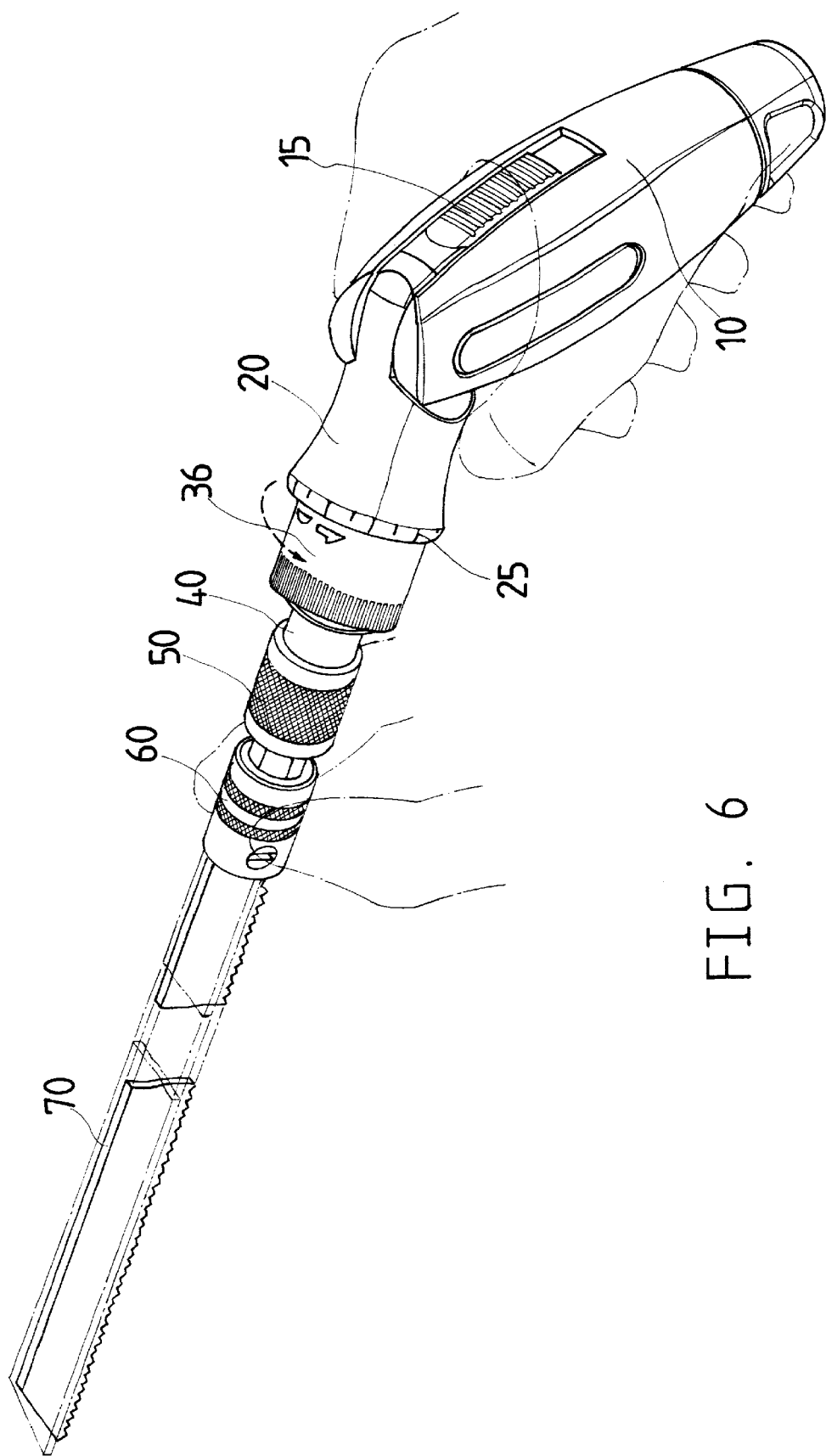
FIG. 6 is a perspective assembly operational view of the saw having an angle adjustable blade as shown in FIG. 1.

In operation, referring to FIGS. 1–5, the rotation ring 36 of the ratchet structure 3 is rotated to match the angle scales 25 of the pivot seat 20, so that the rotation ring 36 of the ratchet structure 3 is moved from the position as shown in FIG. 4 where the positioning ball 37 is locked in the middle positioning recess 360 of the rotation ring 36 to the position as shown in FIG. 5 where the positioning ball 37 is locked in the side positioning recess 360A of the rotation ring 36. Thus, the toothed ratchet block 35 at one side of the positioning member 30 and the ratchet teeth 41 of the ratchet rod 40 are disposed at an idle state. Thus, as shown in FIG. 6, the angle of the blade 70 relative to the handle may be adjusted arbitrarily by rotating the blade 70 relative to the handle, without having to change and adjust the angle of the handle, thereby facilitating the user operating the handle, and thereby preventing the user's wrist from being hurt. In addition, the angle of the blade 70 relative to the handle may be adjusted arbitrarily so as to match the direction of the workpiece, so that the blade 70 is used to saw the workpiece in the right direction, thereby preventing the blade 70 from being broken, and thereby increasing the lifetime of the blade 70.

Figure 7:
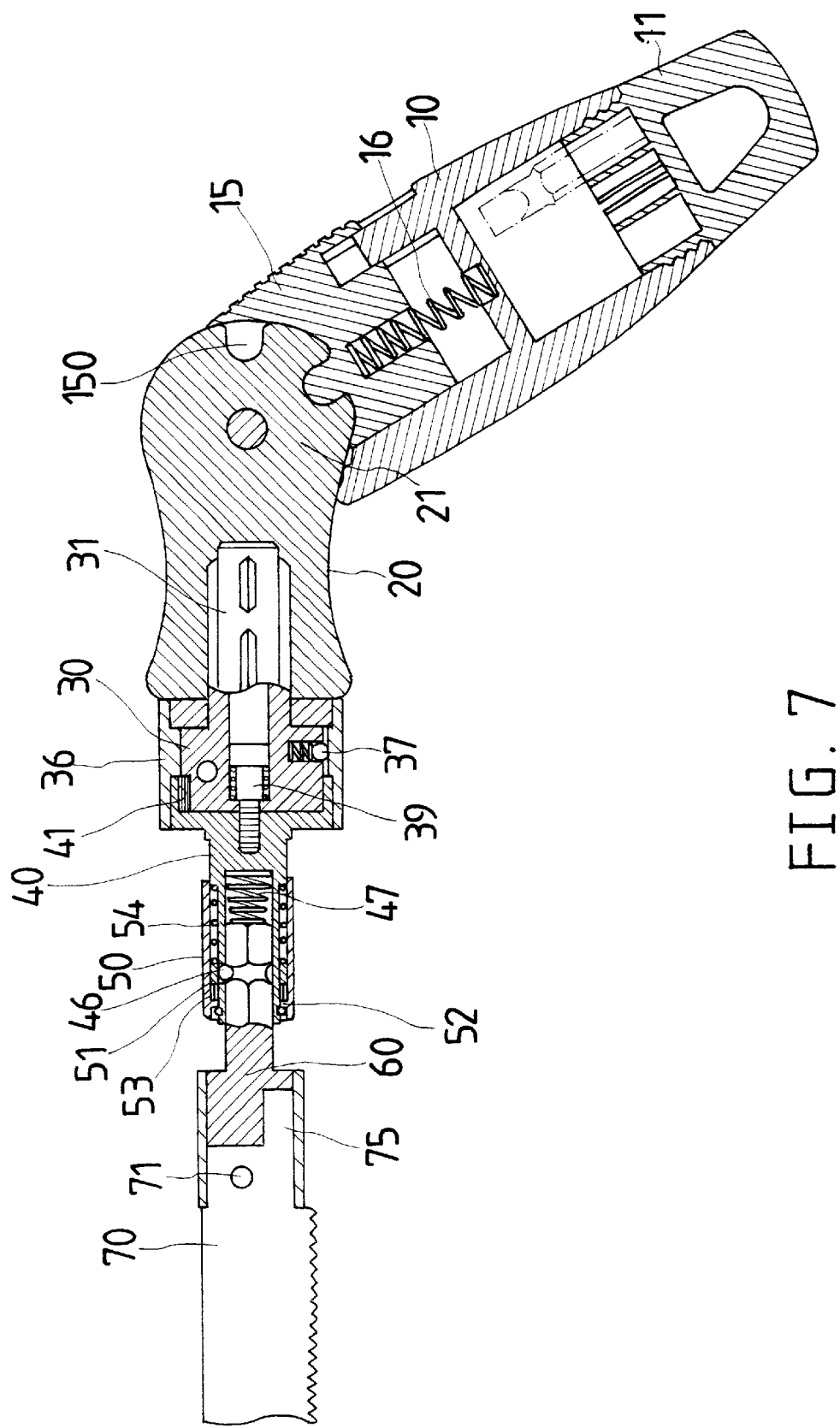
FIG. 7 is a partially cut-away side plan cross-sectional view of the saw having an angle adjustable blade as shown in FIG. 6.

As shown in FIGS. 6 and 7, the push block 15 on the body 10 is pushed backward, to detach the protruding locking portion 150 of the push block 15 from one of the locking recesses 23 of the pivot block 21 of the pivot seat 20, so that the pivot seat 20 is pivoted relative to the body 10, so as to adjust the angle of the pivot seat 20 relative to the body 10. After adjustment, the push block 15 is released, and is returned to its original position by the restoring force of the restoring spring 16, so that the protruding locking portion 150 of the push block 15 is locked in one of the locking recesses 23 of the pivot block 21 of the pivot seat 20, thereby fixing the pivot seat 20 on the body 10.

As shown in FIGS. 2 and 3, the push ring 50 on the ratchet rod 40 is pushed backward, so that the retaining ball 46 of the ratchet rod 40 is received in the annular groove 53 of the push ring 50, and is detached from the annular retaining groove 62 of the fixing rod 60. Thus, the fixing rod 60 is detached from the ratchet rod 40, thereby facilitating the user replacing the blade 70.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A saw having an angle adjustable blade, comprising a handle and a blade, the handle including a body and a ratchet structure, the ratchet structure including a positioning member and a ratchet rod, wherein:

the positioning member is mounted on the body and has a periphery formed with two adjacent notches for receiving two toothed ratchet blocks and a through hole located between the two notches for receiving an elastic member which is urged between the two ratchet blocks, a rotation ring is mounted on the positioning member to encompass the two ratchet blocks, the rotation ring has an inner wall formed with three positioning recesses, a restoring spring is mounted in the periphery of the positioning member, for pressing a positioning ball which is locked in one of the three positioning recesses of the rotation ring; and the ratchet rod is mounted between the positioning member and the rotation ring, and has a rear side having an inner wall formed with a plurality of ratchet teeth meshing with the two ratchet blocks, and a front side for mounting the blade.

2. The saw having an angle adjustable blade in accordance with claim 1, wherein the body has a rear end formed with an opening for screwing an end cap which is formed with a plurality of chambers for receiving screwdrivers.

3. The saw having an angle adjustable blade in accordance with claim 1, wherein the body has a front end formed with a receiving recess for receiving a pivot seat and a slide slot communicating with the receiving recess, a push block is slidably mounted in the receiving recess of the body and has a top edge slidably mounted in the slide slot of the body, the push block has a front side formed with a protruding locking portion, and the pivot seat has a rear end having a periphery formed with a plurality of locking recesses, so that the locking portion of the push block is locked in one of the locking recesses.

4. The saw having an angle adjustable blade in accordance with claim 3, further comprising a restoring spring mounted in the receiving recess of the body and urged between the rear side of the push block and the body.

5. The saw having an angle adjustable blade in accordance with claim 1, wherein the body has two sides each formed with an insertion recess for insertion of a protective pad.

6. The saw having an angle adjustable blade in accordance with claim 5, wherein the insertion recess of the body has a wall formed with a sink hole communicating with the receiving recess, the pivot seat is formed with a pivot hole, and a pivot pin is extended through the pivot hole of the pivot seat and the sink hole of the body, and is screwed with a nut, so that the pivot seat is pivotally mounted on the body.

7. The saw having an angle adjustable blade in accordance with claim 3, wherein the pivot seat has a front end formed with an insertion hole which has a periphery formed with a plurality of retaining slits, the positioning member is provided with an insertion rod inserted into the insertion hole of the pivot seat, and the insertion rod of the positioning member has a periphery formed with a plurality of retaining plates locked in the retaining slits of the insertion hole of the pivot seat, to prevent the positioning member from being rotated freely.

8. The saw having an angle adjustable blade in accordance with claim 3, wherein the pivot seat has a front end having a periphery formed with a plurality of angle scales.

9. The saw having an angle adjustable blade in accordance with claim 3, further comprising a washer mounted between the rotation ring, the 8 positioning member and the pivot seat.

10. The saw having an angle adjustable blade in accordance with claim 1, wherein the positioning member has a center formed with a stepped pivot hole, the ratchet rod has a rear side having a center formed with a screw bore, and a threaded pivot post is extended through an elastic member, the pivot hole of the positioning member, and is screwed into the screw bore of the ratchet rod.

11. The saw having an angle adjustable blade in accordance with claim 1, wherein the ratchet rod has a front side having an inner wall formed with a polygonal hole for receiving a push spring and an outer wall formed with an annular snap groove for snapping a C-shaped snap, and the front side of the ratchet rod has a periphery formed with a through hole for receiving a retaining ball.

12. The saw having an angle adjustable blade in accordance with claim 11, further comprising a quick release structure mounted on the ratchet rod and including a push ring slidably mounted on the ratchet rod by using the C-shaped snap, wherein the push ring has an inner wall formed with a press flange for pressing the retaining ball of the ratchet rod, a retaining flange rested on the C-shaped snap, and an annular groove located between the press flange and the retaining flange for receiving the retaining ball of the ratchet rod.

13. The saw having an angle adjustable blade in accordance with claim 12, further comprising a restoring spring mounted between the press flange of the push ring and the ratchet rod.

14. The saw having an angle adjustable blade in accordance with claim 11, further comprising a fixing rod having a rear end formed with a polygonal post which is inserted into the polygonal hole of the ratchet rod and is formed with an annular retaining groove for retaining the retaining ball of the ratchet rod.

15. The saw having an angle adjustable blade in accordance with claim 14, wherein the fixing rod has a front end formed with a stepped clamping slit and having a periphery formed with an annular sleeve, the blade has one end formed with a stepped clamping plate inserted into the stepped clamping slit of the fixing rod and formed with a through hole, and an urging screw is screwed into the annular sleeve and the fixing rod, and is extended through the through hole of the stepped clamping plate of the blade, so as to lock the annular sleeve, the fixing rod and blade by the urging screw.

* * * * *